United States Patent [19]
Stalley et al.

[11] Patent Number: 5,479,286
[45] Date of Patent: Dec. 26, 1995

[54] OPTICAL FIBRE COMMUNICATIONS SYSTEM

[75] Inventors: Kevin D. Stalley, Suffolk; Donald E. A. Clarke, Essex; Paul A. Rosher, Suffolk, all of England

[73] Assignee: British Telecommunications public limited company, London, England

[21] Appl. No.: 191,501

[22] Filed: Feb. 4, 1994

[30]  Foreign Application Priority Data

Aug. 4, 1993 [EP]  European Pat. Off. .............. 93306146

[51] Int. Cl.⁶ .................................................. H04J 14/02
[52] U.S. Cl. .......................... 359/125; 319/121; 319/152; 319/167; 319/168
[58] Field of Search ..................... 359/121, 113, 359/125, 127, 137, 143, 152, 164, 167, 168, 173; 348/12–16; 455/6.1

[56]  References Cited

U.S. PATENT DOCUMENTS

| | | | |
|---|---|---|---|
| 4,441,180 | 4/1984 | Schussler | 359/125 |
| 5,058,102 | 10/1991 | Heidemann | 359/125 |
| 5,311,344 | 5/1994 | Bohn et al. | 359/125 |

FOREIGN PATENT DOCUMENTS

| | | | |
|---|---|---|---|
| 623498 | 2/1990 | Australia . | |
| 0386466A3 | 2/1990 | European Pat. Off. . | |
| 0380945 | 9/1990 | European Pat. Off. . | |
| 0386482 | 9/1990 | European Pat. Off. | 359/125 |
| 8702205 | 4/1987 | WIPO | 319/113 |
| 9109478 | 6/1991 | WIPO . | |

OTHER PUBLICATIONS

D. Mestdagh et al., "Broadband Passive Optical Access Networks", Revue HF, vol. XIV, No. 7/8, 1990, Ophain BE, pp. 194–210 XP208851.

Olshansky et al., "Subcarrier Multiplexed Broad–Band Service Network: A Flexible Platform for Broad–Band Subscriber Services", Journal of Lightwave Technology, vol. 11, No. 1, Jan. 1, 1993, New York, U.S., pp. 60–68.

Tsuchiya et al., "Analysis and Design for Optical Video Transport/Distribution System with Video on Demand Service", Journal of Lightwave Technology, vol. 11, No. 1, Jan. 1, 1993, New York, U.S., pp. 106–115.

*Primary Examiner*—Leo H. Boudreau
*Assistant Examiner*—Kinfe-Michael Negash
*Attorney, Agent, or Firm*—Nixon & Vanderhye

[57]  ABSTRACT

An optical fibre communications system includes a head end connected to n customers by an optical fibre network. The head end has a transmitter unit and a receiver unit, and each of the customers has an optical network unit with an optical receiver and a transmitter unit. The head end transmitter and receiver units are connected respectively to the receivers and the transmitter units of the customer optical network units by at least one passive optical network. The head end transmitter unit includes an optical transmitter driven by a sub-carrier multiplexer, the sub-carrier multiplexer having a plurality of input sub-carriers at different frequencies. One of the sub-carriers carries interactive signals provided by a further optical transmitter unit. The remaining sub-carriers carry broadband service signals. Each customer transmitter unit includes an optical transmitter and apparatus for multiplexing interactive signals and control signals to drive the optical transmitter. The head end includes a system control unit for controlling the transmission of broadband services by the head end transmitter unit in dependence upon the control signals received by the head end receiver unit from the customer transmitter units.

12 Claims, 2 Drawing Sheets

5,479,286

OPTICAL FIBRE COMMUNICATIONS SYSTEM

BACKGROUND OF THE INVENTION

1. Field of the Invention

This invention relates to an optical fibre communications system, and in particular to an optical fibre communications system capable of carrying both broadband signals and interactive signals such as telephony and ISDN.

2. Related Art

In optical transmission systems, the radiation used is not necessarily in the visible region of the electromagnetic spectrum, and so the word "optical" and "light" when used in this specification are not to be interpreted as implying any limitation to the visible spectrum. For example, the wavelengths preferred for transmission through silica optical fibres are in the infra red region of the spectrum, because the low loss minima of silica fibres occur at about 1.3 and 1.5 microns.

Optical transmission systems may be utilised to distribute both interactive services such as telephony and ISDN, and broadband services such as video channels, video telephony and information services such as picture videotext. In general, the primary service, at least as presently measured in terms of subscriber lines, is telephony. Increasingly, however, there is a perceived need for optical transmission systems to be able to carry both interactive services and broadband services.

Various techniques are available for separating different services for transmission over the same lines, for example the transmitted signals may be time, wavelength or sub-carrier frequency multiplexed. Wavelength division multiplexing (WDM), with different services on different wavelengths, would require additional optical transmitters and receivers to be installed wherever an expansion of services and additional channels is required.

Conventional broadband service provision, for example that provided by the cable TV companies, uses amplitude modulated (AM) transmission. Unfortunately, AM transmission is not suitable for passive optical networks (PONs), due to signal-to-noise-ratio limitations and intermodulation distortion imposed by optical transmitters. Although lasers are being developed which offer the prospect of meeting the required performance in these two areas, the optical budget achievable will still be very limited, and optical splitting of the signal will, therefore, be minimal.

SUMMARY OF THE INVENTION

The present invention provides an optical fibre communications system comprising a head end connected to n customers by an optical fibre network, the head end comprising a transmitter unit and a receiver unit, and each of the customers has an optical network unit comprising an optical receiver and a transmitter unit, the head end transmitter and receiver units being connected respectively to the receivers and the transmitter units of the customer optical network units by at least one passive optical network, said at least one passive optical network constituting the optical fibre network, wherein the head end transmitter unit is constituted by an optical transmitter driven by a sub-carrier multiplexer, the sub-carrier multiplexer having a plurality of input sub-carriers at different frequencies, one of said sub-carriers carrying interactive signals provided by a further optical transmitter unit, and the remaining sub-carriers carrying broadband service signals, wherein each customer transmitter unit includes an optical transmitter and means for multiplexing interactive signals and control signals to drive said optical transmitter, and wherein the head end includes a system control unit for controlling the transmission of broadband services by the head end transmitter unit in dependence upon the control signals received by the head end receiver unit from the customer transmitter units.

Advantageously, the head end optical transmitter is arranged to operate at a first predetermined wavelength, and each of the customer transmitters is arranged to operate at a second predetermined wavelength. Preferably, the first predetermined wavelength lies in the range of from 1500 nm to 1650 nm, and the second predetermined wavelength lies in the range from 1260 nm to 1360 nm.

In a preferred embodiment, said at least one passive optical network is constituted by separate first and second simplex passive optical networks, each having an n-way split, the first simplex passive optical network connecting the head end transmitter unit to the receivers of the customer optical network units, and the second simplex passive optical network connecting the head end receiver unit to the transmitter units of the customer optical network units. Alternatively, said at least one passive optical network may be constituted by a duplex passive optical network having an n-way split. In this case, the head end transmitter unit and the head end receiver unit are connected to the duplex passive optical network via a wave division multiplexer, and the receiver and transmitter unit of each customer are connected to the duplex passive optical network via a respective wave division multiplexer.

Preferably, the system further comprises a video server for supplying video film signal information to the sub-carriers carrying broadband service signals. Conveniently, a respective receiver/tuner unit is associated with the receiver of each of the customer optical network units, the receiver/tuner units being arranged to convert received video film signal information into a form suitable for reception by a television apparatus.

Advantageously, the interactive signals are digitally phase modulated onto said one sub-carrier. Preferably, the broadband service signals are frequency modulated onto said remaining sub-carriers. Alternatively, the broadband service signals are digitally phase modulated onto said remaining sub-carriers. In either case, QPSK may be used for digitally phase modulating signals onto said sub-carrier(s).

BRIEF DESCRIPTION OF THE DRAWINGS

Two forms of optical fibre communications system, each of which is constructed in accordance with the invention, will now be described, by way of example, with reference to the accompanying drawings, in which.

DETAILED DESCRIPTION OF EXEMPLARY EMBODIMENTS

Figure 1:
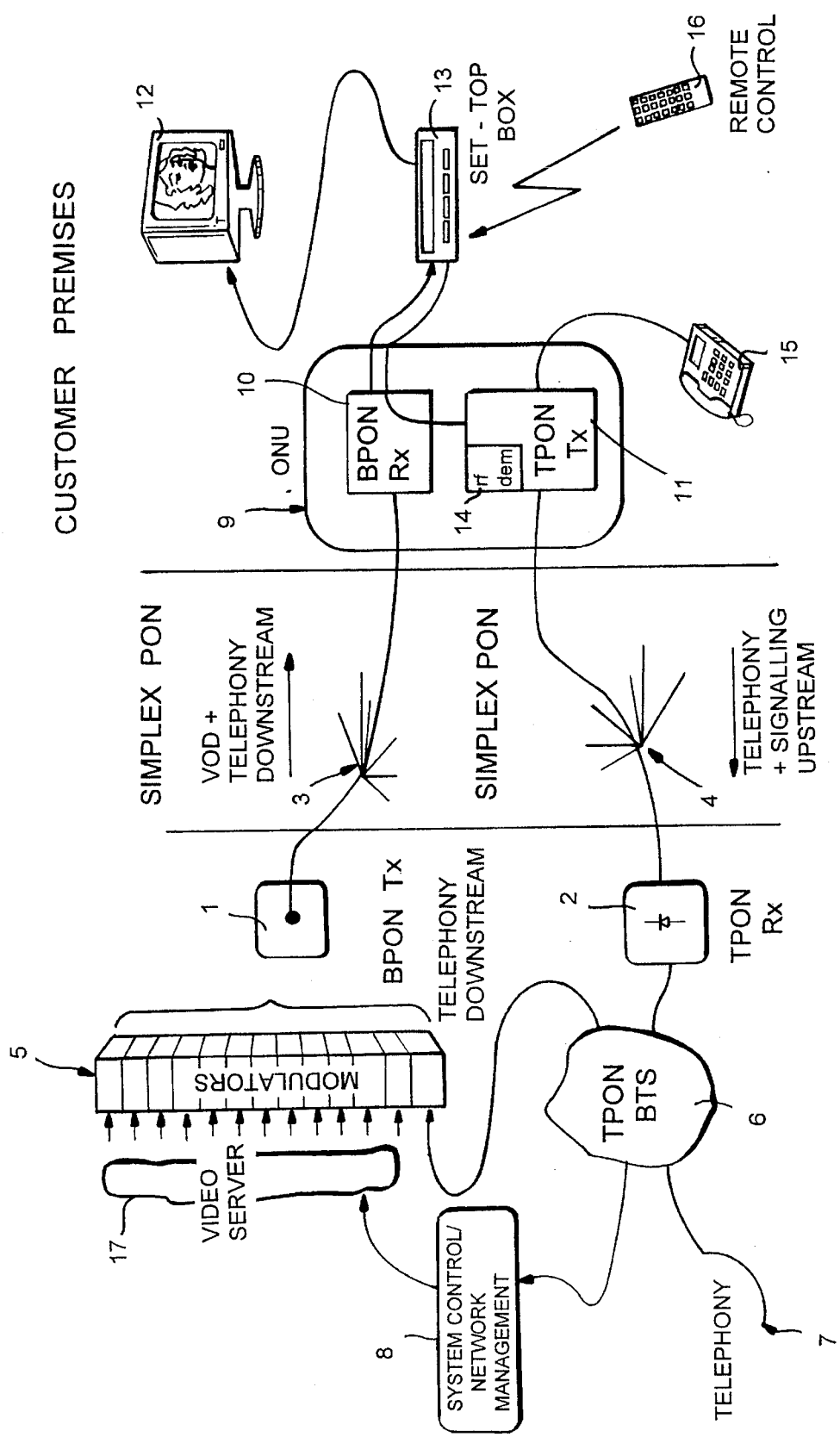
FIG. 1 is a schematic representation of the first system.

Referring to the drawings, FIG. 1 shows a TPON/BPON optical fibre communications system having a head end station including a BPON transmitter 1 and a TPON receiver 2. The transmitter 1 is connected to 256 customer premises (only one of which is shown) via a simplex PON indicated generally by the reference numeral 3. Similarly, the TPON receiver 2 is connected to the 256 customer premises by a simplex PON indicated generally by the reference numeral 4. The BPON transmitter 1 is basically a laser provided with control/monitoring circuitry. If necessary, an optical amplifier (such as a fibre amplifier) will be provided downstream of this laser. A suitable BPON transmitter is that described in the article "Broadband systems on passive optical networks" (British Telecom Technology Journal, vol 7, no. 2, pages 115–122, April 1989). The TPON receiver 2 is a standard TPON optical receiver, for example of the type described in the article "The provision of telephony over passive optical networks" (British Telecom Technology Journal, vol 7, no. 2, pages 100–114, April 1989).

The BPON transmitter 1 is driven by an FM sub-carrier multiplexer 5 which has 32 input sub-carriers each of up to 40 Mb/s capacity. This technique of sub-carrier multiplexing enables transmission of a multiplex of the 32 sub-carriers on an optical wavelength, here chosen to be 1550 nm. The sub-carriers have frequencies ranging from 950 MHz up to 2 GHz, with the carriers being separated by 27 MHz. Each of 31 of the carriers can be either frequency modulated or digitally phase modulated. When frequency modulated, only a single analogue video channel is conveyed on each of the 31 carriers. Each carrier can also be digitally phase modulated using quadrature phase shift keying (QPSK) of up to a bit rate of 40 Mb/s, and so, as each video channel can be compressed to about 2 Mb/s, each of the 31 carriers can support between 16 and 18 compressed video channels whereby the complete multiplex can support 558 channels. The remaining sub-carrier carries signals from a TPON head end 6 which provides interactive services such as telephony, ISDN, fax etc. The TPON head end 6 may be a TPON Bit Transport System (BTS) of the type described in the above-mentioned article "The provision of telephony over passive optical network".

The TPON head end 6 is connected to the main telephony network as indicated by the arrow 7. The entire head end constituted by the TPON transmitter 1, the TPON receiver 2, the sub-carrier multiplexer 5 and the TPON head end 6 are controlled by a control/network management system indicated generally be the reference numeral 8.

Each of the customer premises includes an optical network unit (ONU) 9 which comprises a BPON receiver 10 and a TPON sub-system unit 11. The video channel information output by the receiver 10 is fed to a television 12 via a control box 13 (similar to the set-top receiver used to tune satellite TV signals). The BPON receiver 10 is an avalanche photodiode (APD) of the type described in the above-mentioned article "Broadband systems on passive optical networks". The TPON sub-system unit 11 is a standard BTS network termination unit of the type described in the above-mentioned article "The provision of telephony over passive optical networks". This unit 11 includes an optical transmitter (such as a Fabry-Perot laser) for transmitting video request signals, telephony and other interactive service signals at a wavelength of 1300 nm using a time division multiple access (TDMA) transmission technique. The unit 11 also includes an optical receiver and an RF amplifier circuit for driving the control box 13.

The TPON sub-system unit 11 includes a demodulator 14 for providing TDM TPON signals to the TPON sub-system unit 11. The TDM signals are then demultiplexed to drive customer premises equipment (CPE) such as a telephone 15. Outgoing (upstream) telephony from the telephone 15 is multiplexed by the TPON sub-system unit 11 for TDMA transmission via the PON 4 to the TPON receiver 2 at the head end. Upstream video request signalling from the customer is passed from the control box 13 to the TPON sub-system unit 11, and then back to the head end via the PON 4 and the TPON receiver 2. The control box 13 can be controlled via an infra red remote control unit 16.

In use, the head end broadcasts all the information on all 32 sub-carriers to all of the associated 256 customers via the PON 3. As mentioned above, 31 of the sub-carriers carry video channels, telephony and other interactive services being provided on the remaining sub-carrier dedicated for such services.

The video channels carried by the remaining 31 sub-carriers are provided by a video server 17. The arrangement is such that the network can transmit up to 560 video channels simultaneously (assuming each video channel is compressed to 2 Mb/s, and each sub-carrier carries 18 video channels). If a given subscriber wants to view a particular video film, the necessary request is sent to the head end by that customer's control box 13 (possibly using the remote control unit 16), the associated TPON sub-system unit 11 and the PON 4. The signalling information is received by the TPON receiver 2, and is passed on to the video server 17 via the TPON head end 6 and the control system 8. The video server 17 then transmits the requested video film on to a spare video channel for transmission to that customer together with a control signal which enables that customer's control box 13 to receive that video channel.

Figure 2:
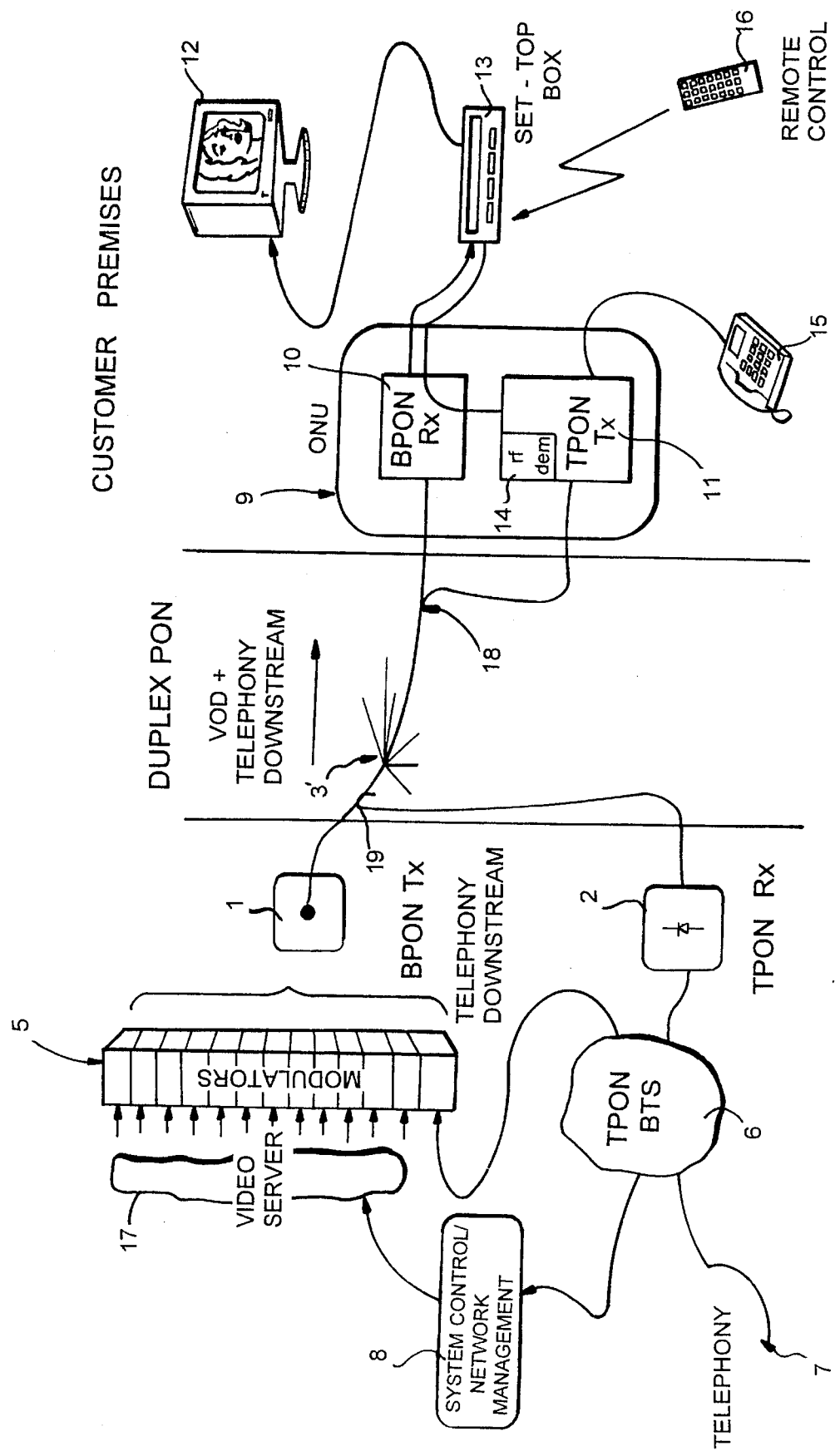
FIG. 2 is a schematic representation of the second system.

FIG. 2 shows a modified form of the system shown in FIG. 1, in which the two simplex PONs 3 and 4 are replaced by a duplex PON 3'. Accordingly, like reference numerals will be used for like parts, and only the modifications will be described in detail. In this embodiment, all the downstream signalling takes place in exactly the same manner as for the embodiment of FIG. 1, that is to say the head end broadcasts all the information on all 32 sub-carriers to all of the associated 256 customers via the BPON transmitter 1 and the PON 3'. Upstream signalling is, however, also carried on the PON 3', with the TPON sub-system unit 11 of each customer being connected to its associated fibre via a WDM 18. Similarly, the TPON receiver 2 is connected to the PON 3' via a WDM 19 upstream of the first splitting point. As before, downstream signalling is at 1550 nm, and upstream signalling at 1300 nm.

It will be apparent that the system described above has a number of advantages compared with known broadband transmission systems. In particular, the use of FM sub-carrier multiplexing has the following advantages, namely:

1. optical constraints which are similar to those for digital (baseband) modulation;
2. low cost lasers can be used, as linearity requirements are less stringent;
3. a high PON split is possible without optical amplification;
4. the frequency band is compatible with the satellite TV receiver band of 950 MHz to 2000 MHz;
5. the equipment used is compatible with terrestrial radio systems; and
6. very small, low power optical receivers can be used.

The compatibility with low-cost satellite receivers already in use is particularly important. Thus, the customer ONU 9 could directly replace a satellite dish, in which case it would be connected directly to the set-top receiver (control box 12), and could be powered by that receiver from the supply intended for the low noise block (LNB).

Each of the systems described above is, therefore, capable of delivering advanced interactive broadband services, such as video on demand direct to the home on fibre. The FM-BPON approach described is capable of a high level optical split, and the integration of the TPON technology with this approach provides a powerful interactive capability.

It will be apparent that the system described above could be used to carry other broadband services than video on demand. For example, each of the TPON/BPON systems described could be modified to provide broadcast TV, satellite TV from a central dish, and innovative new dial-up services applications such as telepresence, broadband videoconferencing, virtual reality and video games.

We claim:

1. An optical fibre communications system comprising:

a head end connected to n customers by an optical fibre network, the head end comprising a transmitter unit and a receiver unit, each of the customers having an optical network unit comprising an optical receiver and a transmitter unit, the head end transmitter and receiver units being connected respectively to the receivers and the transmitter units of the customer optical network units by at least one passive optical network, said at least one passive optical network constituting the optical fibre network, wherein the head end transmitter unit is constituted by an optical transmitter driven by a sub-carrier multiplexer, the sub-carrier multiplexer having a plurality of input sub-carriers at different frequencies, one of said sub-carriers carrying interactive signals provided by a further optical transmitter unit, and the remaining sub-carriers carrying broadband service signals, wherein each customer transmitter unit includes an optical transmitter and means for multiplexing interactive signals and control signals to drive said optical transmitter, and wherein the head end includes a system control unit for controlling the transmission of broadband services by the head end transmitter unit in dependence upon the control signals received by the head end receiver unit from the customer transmitter units.

2. A system as in claim 1, wherein the head end optical transmitter is arranged to operate at a first predetermined wavelength, and each of the customer optical transmitters is arranged to operate at a second predetermined wavelength.

3. A system as in claim 2, wherein the first predetermined wavelength lies in the range of from 1500 nm to 1650 nm, and the second predetermined wavelength lies in the range from 1260 nm to 1360 nm.

4. A system as in claim 1, wherein:

said at least one passive optical network is constituted by separate first and second simplex passive optical networks, each having an n-way split, the first simplex passive optical network connecting the head end transmitter unit to the receivers of the customer optical network units, and the second simplex passive optical network connecting the head end receiver unit to the transmitter units of the customer optical network units.

5. A system as in claim 1, wherein said at least one passive optical network is constituted by a duplex passive optical network having an n-way split.

6. A system as in claim 5, wherein:

the head end optical transmitter is arranged to operate at a first predetermined wavelength, and each of the customer optical transmitters is arranged to operate at a second predetermined wavelength, the head end transmitter unit and the head end receiver unit are connected to the duplex passive optical network via a wave division multiplexer, and the receiver and transmitter unit of each customer are connected to the duplex passive optical network via a respective wave division multiplexer.

7. A system as in claim 1, further comprising a video server for supplying video film signal information to the sub-carriers carrying broadband service signals.

8. A system as in claim 7, wherein a respective receiver/tuner unit is associated with the receiver of each of the customer optical network units, the receiver/tuner units being arranged to convert received video film signal information into a form suitable for reception by a television apparatus.

9. A system as in claim 1, wherein the interactive signals are digitally phase modulated onto said one sub-carrier.

10. A system as in claim 1, wherein the broadband service signals are frequency modulated onto said remaining sub-carriers.

11. A system as in claim 1, wherein the broadband service signals are digitally phase modulated onto said remaining sub-carriers.

12. A system as in claim 9, wherein QPSK is used for digitally phase modulating signals onto said sub-carrier(s).

* * * * *